Figure 1:
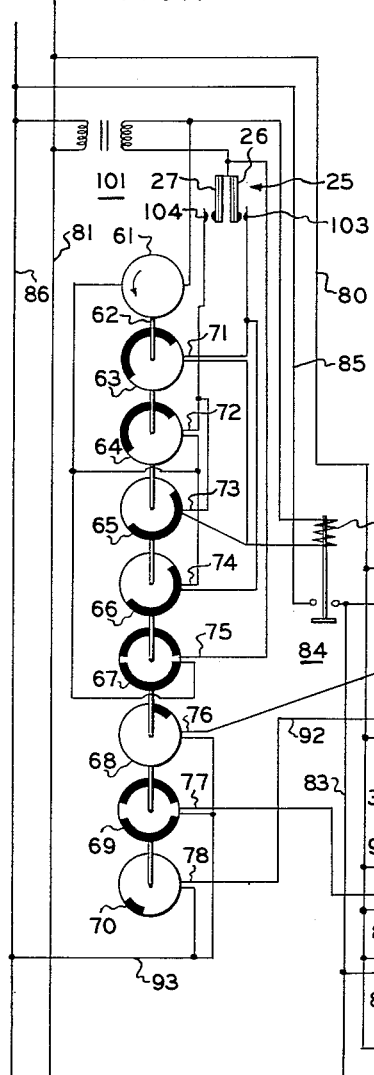

July 19, 1955   C. W. BLATCHFORD   2,713,250
CONTROL FOR REVERSIBLE REFRIGERATION SYSTEMS
Filed Jan. 29, 1954

INVENTOR.
CLAIR W. BLATCHFORD
BY
HIS ATTORNEY ated July 19, 1955

2,713,250

CONTROL FOR REVERSIBLE REFRIGERATION SYSTEMS

Clair W. Blatchford, Union, N. J., assignor to General Electric Company, a corporation of New York Application January 29, 1954, Serial No. 407,045

5 Claims. (Cl. 62—4)

The present invention relates to reversible refrigeration systems and is particularly concerned with an electrical control system for controlling the operation and reversal of such refrigeration systems.

Reversible refrigerating systems, frequently referred to as "heat pumps," may be employed for heating dwellings or other structures in the winter and for cooling such structures in the summer. Various arrangements have been employed for effecting the reversal of the function of the system when it is desired to change over from summer to winter control or vice versa. One such arrangement, involving the reversing of the functions of the evaporator and condenser of the refrigerating apparatus, requires in the apparatus suitable valves known as change-over valves for changing the connections in the refrigerant circuit. These valves are frequently three-way valves arranged to connect the two heat transfer units alternately to the suction and discharge sides of the compressor. Since very substantial forces are required to operate these valves due to the high pressure difference prevailing between the two sides of the refrigerating system, many systems include unloading arrangements which to be effective should be designed to equalize more or less the pressures on the two sides of the system before the change-over valves are brought into operation. For the most efficient operation of the system during reversal of the functions of the evaporator and condenser, it is necessary that the various valves be opened and closed or reversed in the proper sequence and in the case of the change-over valves only after a suitable time interval has elapsed to permit the proper unloading of the system by the unloader valve. Accordingly it is an object of the present invention to provide improved automatic controls for the operation of a reversible refrigerating system.

A further object of the invention is to provide an automatic electrical control system for a reversible refrigerating apparatus including a timer motor operating a plurality of switching means for automatically controlling the apparatus in its operation either as a heating or cooling apparatus.

Another object of the invention is to provide a timer motor operated switching means for operating in proper sequence the various valves required to effect the change over of a reversible refrigerating system.

In carrying out the objects of the present invention, there is provided a reversible refrigerating system which includes the usual compressor, heat exchangers, and refrigerant conduit means connecting the compressor and heat exchangers. Also included are suitable change-over valves for controlling the flow of refrigerant whereby either of the heat exchangers can be made to function as an evaporator and the other as a condenser. For automatically controlling the operation of the system on either a heating cycle or on a cooling cycle and for changing the operation of the system from one cycle to the other, there is provided a plurality of electric circuits for energizing the compressor and the various valve means and including a plurality of motor driven switches adapted to control the operation of the compressor and the various valves in the proper sequence of operation.

Figure 2:
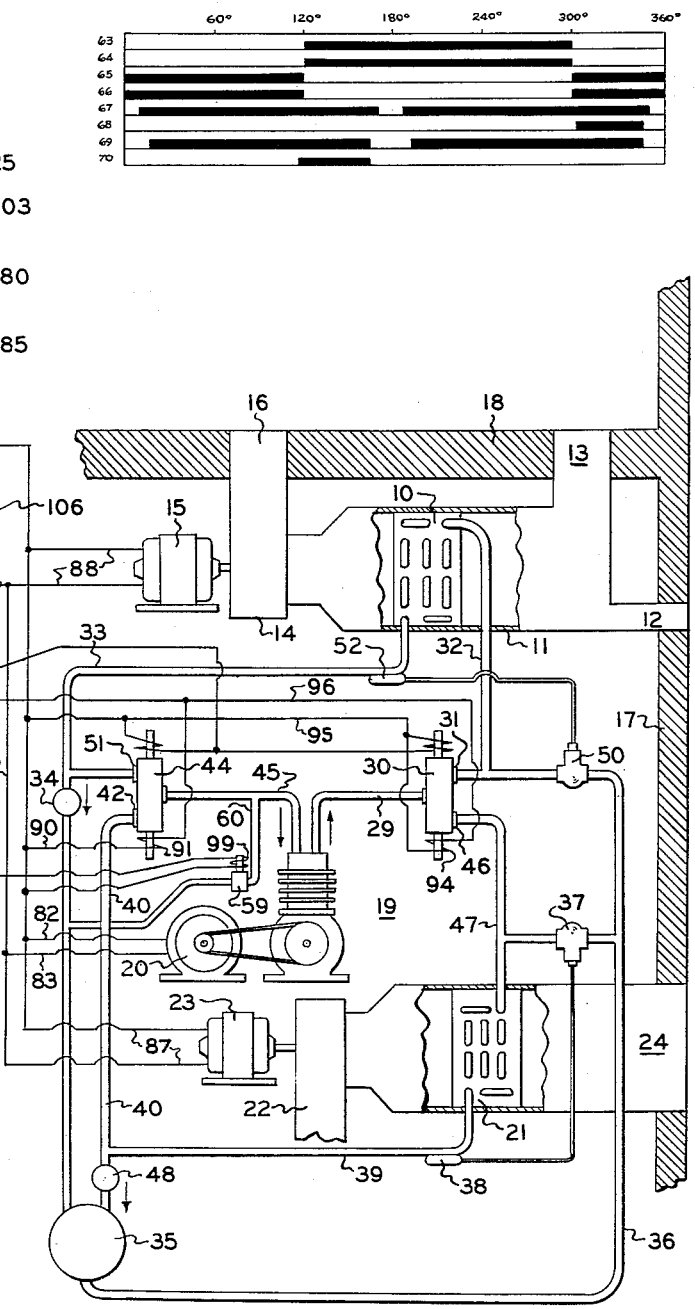

For a better understanding of the invention, reference may be had to the accompanying drawings in which:

Fig. 1 is a diagrammatic illustration of an air conditioning system provided with a reversible refrigerating machine including the electrical control system of the present invention; and Fig. 2 is a schedule of the operation of the switch control means portion of the control system for obtaining the proper sequential operation of the compressor and the various valves comprising the refrigerating system.

Referring now to the drawing, the system disclosed in Fig. 1 comprises an indoor heat transfer unit or coil 10 arranged in a duct 11 to heat or cool air admitted to the duct through a fresh air inlet 12 and through a room or return air inlet 13 and circulated over the unit 10 by operation of a blower within a casing 14 driven by a motor 15, the air discharged from the blower being returned to the room by a duct or outlet 16. In the illustration, the outside walls of the building are indicated at 17, and a partition through which pass the ducts 13 and 16 is indicated at 18. The unit 10 is arranged to operate either as the condenser or the evaporator of a compression type refrigerating machine including a compressor 19 driven by an electric motor 20 and a heat exchange unit or coil 21 over which outdoor air is circulated by a blower 22 driven by an electric motor 23. The blower 22 is arranged to draw air from an outside duct or connection 24 and discharge it to a suitable exhaust connection (not shown). The operation of the refrigerating machine is controlled by a thermostat 25 compressing bimetallic elements 26 and 27 forming part of the electrical control system of the present invention. When the refrigerating machine is operating with the unit 10 as a condenser and the unit 21 as an evaporator for heating purposes during the winter, hot compressed refrigerant is delivered by the compressor 19 through a discharge line 29 to the fluid inlet connection of a three-way valve 30 and passes through the upper fluid outlet connection 31 of the three-way valve and thence through a conduit 32 to the unit 10. The refrigerant in the unit 10 is cooled and condensed by heat exchange with the air circulated through the duct 11, and the liquefied refrigerant flows through a line 33 and a check valve 34 to a liquid receiver 35. Liquid refrigerant then flows through a liquid line 36 and a thermostatic expansion valve 37 to the unit 21. The valve 37 is provided with a feeler bulb 38 in heat exchange with the outlet of the unit 21 and operates in the usual manner to maintain a predetermined amount of super-heat of the refrigerant discharged from the unit 21. The vaporized refrigerant then flows through an outlet conduit 39 and a suction line 40 to a fluid inlet connection 42 in a three-way valve 44 and thence through the fluid outlet to a suction or intake conduit 45 of the compressor 19.

When the system is reversed for summer operation the unit 10 is employed as an evaporator and the positions of the valves 30 and 44 are reversed. Hot gas discharged from the compressor 19 then flows through the valve 30 and out a lower fluid outlet connection 46 and a conduit 47 to the unit 21 where it is condensed and liquefied; the liquid refrigerant flows through the outlet conduit 39 and thence through a check valve 48 to the liquid receiver 35. The liquid flows from the receiver through the liquid line 36 to a thermostatic expansion valve 50, the valve 37 being maintained closed because of the pressure difference existing between the conduits 36 and 47. From the valve 50 the liquid refrigerant flows through the conduit 32 to the unit 10 where it is evaporated by heat exchange with the air flowing through the duct 11. The vaporized refrigerant returns through the conduit 33 and an upper fluid inlet connection 51 of the valve 44 to the compressor through the conduit 45. The superheat of the refrigerant returning through the line 33 is controlled by the expansion valve 50 which is provided with a thermal feeler bulb 52 mounted in the usual manner in heat exchange relationship with the discharge connection of the unit 10.

For unloading the system whenever the thermostat 25 requires a change over from heating to cooling or vice versa, there is provided a solenoid operated unloading valve 59 in a conduit 60 connecting the suction side or low pressure side of the system to the high pressure side. This conduit 60 is shown as connecting conduit 45 to conduit 33 between the check valve 34 and the receiver 35.

The operation of the system is controlled electrically by control circuits energized in accordance with the movement of bimetallic strips 26 and 27 of the thermostat 25. In addition to the thermostat, the electrical control system includes a plurality of motorized switches collectively operated by a nonreversing timer motor and so arranged that upon a call by the thermostat for the same operating cycle, the operation of the refrigerating system will be under control of only the thermostat without requiring any operation of the timer motor. On the other hand if the thermostat calls for the opposite cycle the control system is designed to energize the timer motor so that the various motorized switches operate in the desired sequence to effect the proper change over of the system for operation on the opposite cycle.

This motorized switching mechanism includes a nonreversible motor 61 and a shaft 62 connecting the motor to a drum contactor including a plurality of switch plates 63 to 70 inclusive which are formed of insulating material and have conducting contact sectors of different sizes thereon. Each of the plates forming the drum contactor have cooperating brushes or contactors indicated by numerals 71 to 78 inclusive which together with the contact sectors on the plates 62 to 70 inclusive form motor operated switches or switching means for controlling various parts of the refrigerating system. In the following description these motor operated or motorized switches will be referred to using the same reference numerals employed in designating the plates forming the switching mechanism thereof.

The energizing circuit for the compressor includes lead 80 from supply line 81, lead 82 connected to the motor 20, return lead 83, relay switch 84 and lead 85 connected to the second supply line 86. Fan motors 15 and 23 are connected to the same energizing circuit under control of switch 84 by the two pairs of leads 87 and 88.

The change-over valves 30 and 44 and the unloading valve 59 are controlled by circuits which include motorized switches 68, 69 and 70. Each of these valves are solenoid operated. The change-over valves are each provided with two solenoids, one for shifting the valve to a heating position and the other to a cooling position.

The circuit for moving the change-over valves to a heating position includes lead 80, lead 90, solenoid 91 of valve 44, lead 92, switch 70 and lead 93 connected to the supply line 86. Solenoid 94 of valve 30 is connected in parallel with solenoid 91 of valve 44 by leads 95 and 96. When this circuit is energized the lower solenoids of both valves are energized for movement to the heating position. The terms "upper" and "lower" as used herein apply to the positions of the elements on the drawing and are not intended to indicate the preferred physical position of the valves.

Similarly the solenoid at the top of valve 44 and the solenoid at the top of valve 30 are connected in parallel to the supply lines 81 and 86 by a circuit under control of switch 68. The biased-closed unloading valve 59 is separately controlled and is opened by energization of a circuit which includes solenoid 99 of the control valve 59 and the switch 69; the circuit controlling the operation of the unloading valve also being connected across the supply lines 81 and 86.

With the switches 68, 69 and 70 controlling the energizing circuits for these valves, their operation in turn is controlled by the switch motor 61. The switch motor 61 is connected across the secondary of a transformer 101 by three separate circuits each of which includes one of the motorized switches driven by the motor 61 and two of which also include thermal switches operated by thermostat 25. One of these circuits includes motorized switch 67, the purpose of this circuit being to assure operation of the timer motor 61 during certain periods when it is not connected to either of the other circuits.

The remaining circuits controlling the energization of the timer motor may be respectively referred to as heating and cooling circuits. The heating circuit includes bimetal strip 26 of thermostat 25 forming a heating cycle thermostat which upon a call for heat moves to the right to engage a contact 103 whereupon the motor 61 is under control of the switch 66. The cooling circuit on the other hand comprises bimetal 27 forming a cooling cycle thermostat, contact 104 and the motorized switch 64.

Parts of these last two circuits are also employed to control the operation of the compressor. More specifically the heating circuit, which is under the control of the thermal switch comprising bimetal strip 26 and contact 103, also energizes coil 106 which actuates relay 84 while closure of the thermal switch comprising bimetal 27 and contact 104 in the cooling circuit places the solenoid 106 under control of the switch 65. In the heating circuit the solenoid 106 is under control of the motorized switch 63 where the thermal switch is closed. It will be evident from a consideration of the various drum switches 62 to 70 that the contact or conducting areas are of different circumferential lengths and arranged at different positions relative to one another on the various switch plates. The size or relative length of the contact areas and their angular positions on the various plates determining the sequential operation of the timer motor, compressor and the various valves. It will be understood of course that in place of the drum contactor type of switch, cam operated switches designed to effect the same switching operations could be employed in which case a single cam may be arranged to operate more than one switch.

In considering the operation of the control system reference may also be had to Fig. 2 which illustrates the relative positions of the conducting areas on the various switch plates with reference to one complete revolution of the switch plates. The same reference numerals are employed in Fig. 2.

In the switch positions as shown in the drawing, the reversible refrigeration system has just completed a cooling cycle in which the indoor heat exchanger 10 has functioned as an evaporator. All of the motorized switches excepting 65 and 66 are open so that upon a call by the thermostat 25 for the same operation, that is, another cooling cycle by movement of the bimetal strip 27 to the left to engage contact 104, the timer motor 61 will remain deenergized since both contact 64 and 67 are open. The closing of the thermostat controlled switch including bimetal 27 and contact 104 will however energize solenoid 106 of the relay 84 thus completing the power circuit which operates the compressor motor 20 and the fan motors 15 and 23. These motors will continue to operate until the bimetal 27 moves to the right breaking the compressor circuit.

The advantages of the present invention are most apparent from a consideration of the operation of the control system during a change over from a cooling cycle to a heating cycle or vice versa. For example, if following a cooling cycle, the thermostat 25 should call for heat by movement of the bimetal 26 to the right into contact with contact 103, one of the timer motor circuits is immediately completed through switch 66 which switch was left in a closed position following the previous cooling cycle. The timer motor 61 begins to rotate in a counterclockwise direction thus moving the various switch plates of switches 62 to 70 inclusive in the same direction. At this point none of the compressor circuits are energized since the thermostatically controlled switch 104 and motorized switch 63 is open. After the timer motor 61 has rotated through a few degrees, switch 67 closes its timer motor circuit and the conducting portions of this switch are such that switch 67 remains closed until the timer motor has rotated slightly less than 180°. On continued rotation of the timer motor, switch 69 included in the unloading valve circuit is closed connecting the unloading valve solenoid 99 across the supply lines 81 and 86. The unloading valve is thereupon opened so that the pressures on the two sides of the refrigerating system can become equalized. After a predetermined interval of time sufficient to accomplish the unloading, motorized switch 70 closes to energize solenoids 91 and 94 which effect a change over of the valves 44 and 30 to their heating positions wherein the compressed refrigerant from compressor 19 flows first to the indoor heat exchanger 10. With the unloading circuit including the solenoid 99 and the change-over circuits including the solenoids 91 and 94 still energized, switch 63 is closed thus completing the circuit including the thermostat control switch 103 and switch 63 to energize solenoid 106 of relay 84 and close the power circuits to the compressor motor 20 and fan motors 15 and 23.

During the period of time the timer motor 61 was under control of the circuit including switch 67, the switches 65 and 66, which were closed during the cooling cycle, are opened. After these switches are opened and while the timer motor is still under control of switch 67, switch 64 is closed. The closing of switch 64 has no effect upon the operation of the system at this time but merely prepares the control system for future operation of the timer motor in the event the thermostat requires a change back to the cooling cycle.

Shortly before the timer motor has completed a one-half revolution of the switch mechanisms switch 67 is opened as are also switches 69 and 70 controlling the operation of the unloading valve and the change-over valves. As will be noted from the schedule of Fig. 2 the solenoids controlling the change-over valves and the solenoids controlling the unloading valve remain energized for a short period after the compressor is started by the closing of switch 63 to permit the building up of sufficient pressure differentials within the change-over valve mechanisms to hold the valves in their desired positions without the aid of the solenoids.

After rotation of the timer motor 61 through 180° to a heating cycle, the various switches are in such positions that upon a repeated call for a heating cycle the timer motor 61 remains inoperative and only the compressor and fan motors are energized by the control circuit including the contact 103 and the closed switch 63. The remaining one half of the drum contactor switch mechanism is designed along the same lines as that half which has just been described with the various conducting areas being so arranged as to obtain a reversal of the refrigerating system from the heating cycle or position to the cooling cycle or position in the event the thermostat 25 calls for such. In effecting the change to the cooling cycle, the timer motor is energized by means of switch 64 and the unloading valve circuit is under control of switch 69. The change-over valves 30 and 44 are moved to their cooling positions by the closing of switch 68 at the proper time, that is after the unloading operation has been substantially completed.

From the foregoing it is readily apparent that simple and effective arrangements have been provided for controlling a reversible refrigeration system either under repeated calls for the same cycle of operation or for a reversal of the refrigerating system from one cycle to the other. Since the switch-over operation is timer controlled with the operation of the various components such as the unloading valve and the change-over valves arranged in proper sequence by means of the motorized switching mechanism the pressure differential switches and relays previously employed for the purpose of preventing operation of the change-over valves prior to effective unloading of the system are not required.

Although the invention has been described in connection with a specific form of automatic electric control circuit employing switches of the drum contactor type, other control arrangements will occur to those skilled in the art and it is therefore intended by the appended claims to cover all modifications within the spirit and scope of the invention.

What I claim as new and desire to secure by Letters Patent of the United States Patent Office is:

1. A reversible refrigerating system comprising a refrigerant circuit including a compressor, two heat exchanges, conduit means connecting said compressor and said heat exchangers including electrically operated changeover valve means for reversing the flow of refrigerant to said heat exchangers, and an electrical control system for controlling the operation of said system including a thermostat and a plurality of switches operated by a single switch motor and arranged automatically to operate said valve means during reversal of the operation of said system, said control system including a switch motor energizing circuit comprising a thermostatically operated switch adapted to complete said motor energizing circuit upon a call by said thermostat for reversal of said refrigerating system.

2. A reversible refrigerating system, including a compressor, a compressor motor therefor, heat exchangers, refrigerant conduit means connecting the compressor and heat exchangers, electrically operated change over valve means for controlling the flow of refrigerant whereby either of said heat exchangers functions as an evaporator and the other as a condenser, electrically operated unloading valve means between the high and low pressure sides of said system, a plurality of electric circuits for energizing said motor and said valve means, motor operated switching means including a plurality of motorized switches in said circuits, a switch motor operating said switches, first and second circuits for energizing said switch motor including a thermostatically operated switch adapted to close said first circuit at one of two opposite limiting positions and said second circuit at the other of said two positions, and a third circuit including one of said motor operated switches for energizing said switch motor, said motor operated switching means being arranged to close said one of said motor operated switches only when said thermostatically operated switch moves to a limiting position opposite to the position in which the one of said first and second circuits including said thermostatically operated switch previously energized said switch motor.

3. In a heat pump, a refrigerant system including a compressor, an indoor heat exchanger, an outdoor heat exchanger, electrically operated change-over valves for controlling the flow of refrigerant whereby said indoor heat exchanger can be operated either on a heating cycle or on a cooling cycle, an electrically operated unloading valve for reducing pressure differences within said refrigerant system prior to operation of said change-over valves, and an electrical control system for said heat pump including electrical circuits for energizing said compressor and said valves, a plurality of motorized switches in said circuits collectively operated by a single timer switch motor, said circuits comprising a motor circuit including a motorized motor switch for closing said motor circuit, an indoor thermostat, a heating cycle control circuit for said compressor in parallel with said motor circuit including in series a switch actuated by said thermostat to close said heating cycle control circuit when the thermostat calls for heating and a switch operable by said switch motor, a cooling cycle control circuit for said compressor in parallel with said motor circuit and said heating cycle power circuit and including in series a thermo switch actuated by said thermostat to close said cooling cycle circuit when the thermostat calls for cooling and a switch operated by said switch motor, said heating and cooling cycle circuits being open when said thermostat calls for neither heating nor cooling, additional motor circuits including additional motorized switches connecting each of said cycle control circuits to said motor circuit, change-over valve circuits including motorized switches for controlling said change-over valves for operation of the pump on either a heating cycle or a cooling cycle, an unloader valve circuit including a motorized switch for opening said unloading valve, said motorized switches being arranged so that upon the termination of a heating or cooling cycle, the motorized switch in the one of the compressor control circuits controlling the operation of said compressor during the terminated cycle and the motorized switch controlling the operation of said switch motor in one of said additional motor circuits are closed and the remaining motorized switches are open, whereby said switch motor is not energized except upon closing of the thermostat operated switch in the other of said compressor control circuits, the closing of said thermostat operated switch in the other compressor control circuit effecting in sequence the closing of said motor control switch, the opening of said unloading valve, the reversal of said change-over valves, the closing of the motorized switch in the other compressor control circuit and the motorized switch in other of said additional motor circuits and the opening of the motorized switch in said one of said additional motor circuits.

4. In a heat pump, a refrigerant system including a compressor, an indoor heat exchanger, an outdoor heat exchanger, electrically operated change-over valves for controlling the flow of refrigerant whereby said indoor heat exchanger can be operated either on a heating cycle or on a cooling cycle, an electrically operated normally closed unloading valve, and an electrical control system for said heat pump including indoor heating cycle and cooling cycle thermostats, electrical circuits for energizing said compressor and said valves, a plurality of motorized switches in said circuits collectively operated by a single non-reversing switch motor, said circuits comprising a first motor circuit including a motor control switch, a second motor control circuit including a switch operated by one of said thermostats and a motorized switch, a third motor control circuit including a switch operated by the other of said thermostats and a motorized switch, parallel compressor control circuits, the first including said one of said thermostat operated switches and a motorized switch, and the second including said other of said thermostat operated switches and a motorized switch, said thermostat operated switches being open when the thermostats call for neither heating nor cooling, changeover valve circuits including motorized switches for controlling said change-over valves for operation of the pump on either a heating cycle or a cooling cycle, an unloader valve circuit including a motorized switch for opening said unloading valve, said motorized switches being arranged so that upon termination of a cycle of operation of said system the motorized switches in said second compressor control circuit and the second motor control circuit are closed and the remaining motorized switches are open so that said switch motor is not energized except upon the closing of said one of said thermostat operated switches in said second motor control circuit, the closing of said one of said thermostat operated switches effecting in sequence the starting of said switch motor, the closing of the motorized switch in the first motor control circuit, the opening of said unloading valve, the reversal of said change-over valves, the opening of the motorized switches in said second compressor control circuit and said second motor control circuit, the closing of the motorized switches in third motor control circuit and the first compressor control circuit, the closing of the unloading valve and the opening of the motorized switch in said first motor control circuit to stop said motor.

5. In a heat pump, a refrigerant system including a compressor, an indoor heat exchanger, an outdoor heat exchanger, electrically operated change-over valves for controlling the flow of refrigerant whereby said indoor heat exchanger can be operated either on a heating cycle or on a cooling cycle, an electrically operated normally closed unloading valve, and an electrical control system for said heat pump including an indoor heating cycle and cooling cycle thermostat, electrical circuits for energizing said compressor and said valves, and a plurality of switches in each of said circuits collectively operated by a single non-reversing switch motor, switch motor energizing circuits controlled by said thermostat, said switches being arranged for sequential operation so that upon termination of a cycle of operation of said system a call by said thermostat for the same cycle will energize the compressor circuit, and a call for the opposite cycle will energize said switch motor and effect in sequence the opening of said unloading valve, the reversal of said change-over valves, energization of a compressor circuit and closing of the unloading valve.

References Cited in the file of this patent

UNITED STATES PATENTS

| 2,136,559 | Miller | Nov. 15, 1938 |
| 2,152,250 | Gay | Mar. 28, 1939 |
| 2,241,070 | McLenegan | May 6, 1941 |